United States Patent Office 3,174,418
Patented Mar. 23, 1965

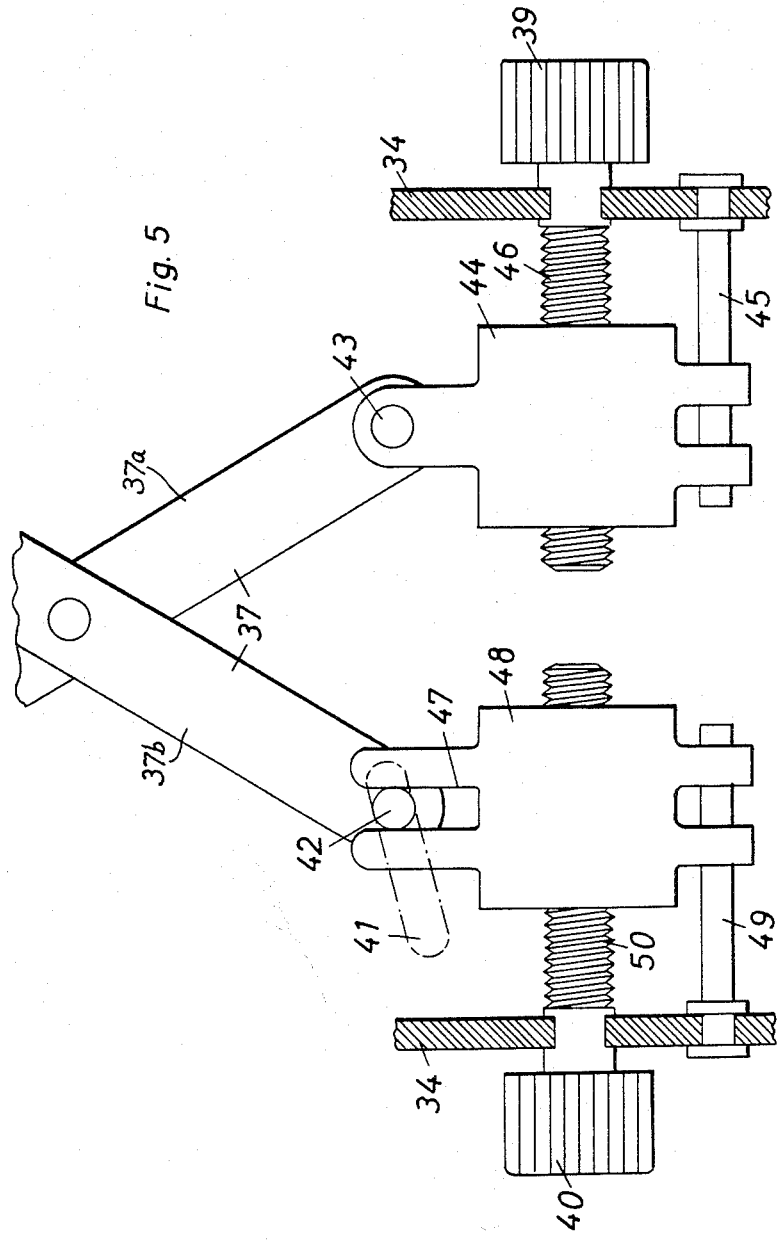

3,174,418
PHOTOGRAPHIC CAMERA
Werner Faasch, Braunschweig-Bienrode, and Kurt Kückelhahn and Harry Schade, Braunschweig, Germany, assignors to Franke & Heidecke Fabrik Photographischer Prazisions-Apparate, Braunschweig, Germany, a German firm
Filed Dec. 18, 1961, Ser. No. 160,211
Claims priority, application Germany, Dec. 22, 1960, F 32,819
7 Claims. (Cl. 95—49)

This invention relates to a photographic camera, and more especially to a camera of the twin lens reflex type, with an accessory or attachment enabling it to be used for close-up work.

An object of the invention is the provision of a generally improved and more satisfactory camera of this kind.

Another object is the provision of a supplementary or accessory viewfinder for use with a close-up attachment employed on the picture taking part of a twin lens reflex camera.

A further object is the provision of a supplementary viewfinder or focusing chamber which makes provision for correction of parallax.

A still further object is the provision of an adjustable viewfinding or focusing chamber, having factors which may be varied in accordance with variations in the extension of the picture-taking chamber of the camera, so that both the picture taking extension and the viewfinder extension or accessory can be adjusted to accommodate them to different focusing ranges.

These and other desirable objects may be attained in the manner disclosed as an illustrative embodiment of the invention in the following description and in the accompanying drawings forming a part hereof, in which:

FIG. 5 is a schematic view of adjusting means constituting part of the invention and useful particularly with the embodiment shown in FIG. 4.

Figure 1:
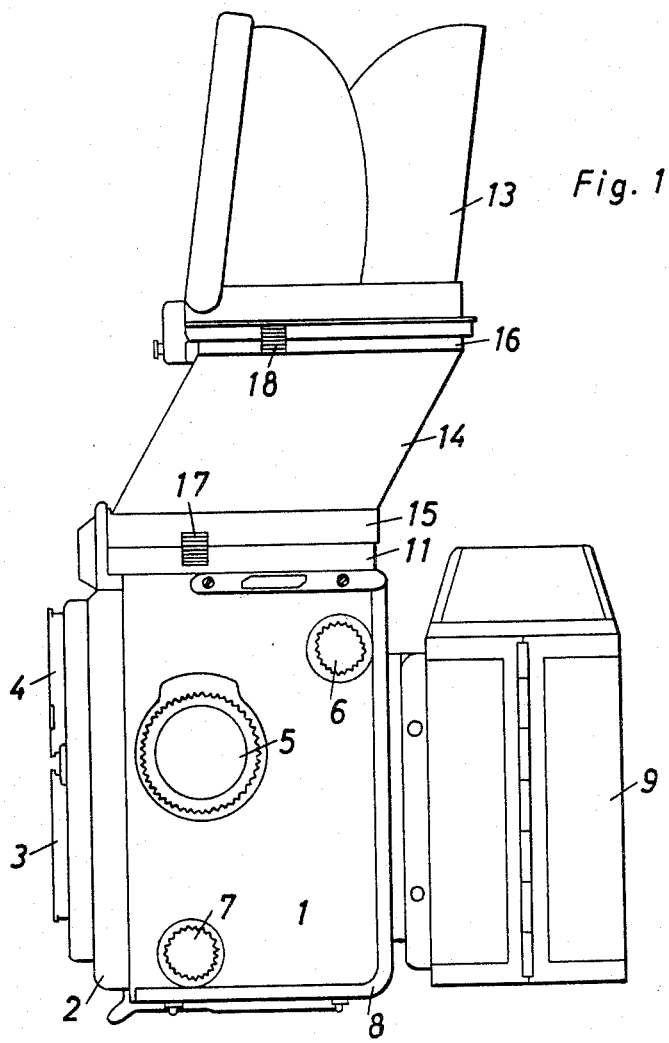
FIG. 1 is a somewhat schematic side elevation of a camera according to one embodiment of the present invention.
Figure 2:
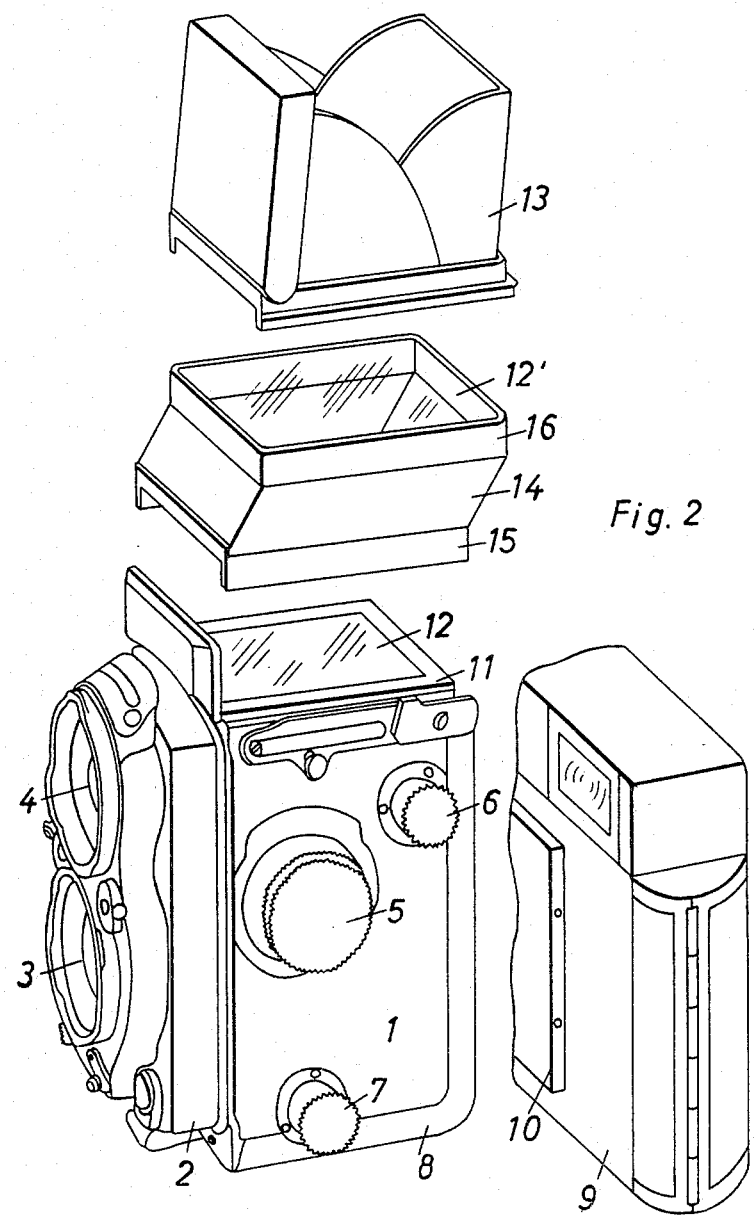
FIG. 2 is an exploded perspective view of the same.

As well understood in the art, a twin lens reflex camera has a picture taking chamber and a viewfinding and focusing chamber, both mounted in rigid relation to each other in a single body such as the body indicated in general at 1 in FIGS. 1–4. The picture taking lens 3, positioned to admit light into the picture taking chamber, and the viewfinding lens 4, positioned to admit light into the viewfinding or focusing chamber, are mounted one above the other on a camera front member or lens board 2 which is movable forwardly and backwardly for focusing purposes, as by means of a focusing knob 5. While the present invention is not limited in its usefulness to any particular make or model of twin lens reflex camera, it is useful particularly with the well known "Rolleiflex" twin lens reflex camera as manufactured by the firm of Franke & Heidecke in Braunschweig, Germany, and widely used and well known in the United States and elsewhere. The following description presupposes that the reader is already familiar with the general constructional features of the "Rolleiflex" camera. Those not already familiar with such cameras may consult, for example, the prior literature referred to in United States Patents 2,963,950, dated December 13, 1960, and 2,981,166, dated April 25, 1961, and 2,990,756, dated July 4, 1961.

Such cameras, as well as other known makes of twin lens reflex cameras, in their normal or un-modified form, usually have a minimum focusing range of about three feet, when the camera front board, carrying the two lenses, is in its maximum forward position. For taking pictures of objects at closer distances, a supplementary lens can be used in front of the picture taking lens, but if this is done, the viewfinding chamber cannot be used for focusing purposes unless a supplementary lens is also used in front of the viewfinding lens. When such a supplementary viewfinding lens is used, there is a great parallax error when taking close-up pictures, unless the supplementary viewfinder lens is of wedge formation. Even when such a wedge lens is used, there is difficulty with proper focusing on the ground glass screen, because the plane of the viewfinder image is tilted, with the consequence that accurate focusing may be accomplished only midway of the height of the picture, the top and bottom of the picture both being out of focus on account of the tilt of the image plane.

Instead of using supplementary lenses in front of the regular or normal lenses, close up pictures can also be taken by extending, in effect, the length of the picture taking chamber by using a supplementary film chamber or film cassette on the back of the camera, thereby increasing the distance from the lens to the plane of the film. This has the advantage that when a supplementary film chamber is used, it may, if desired, hold sensitized material (film or plate or paper) of a different type than the regular film with which the camera is normally used. Thus for example the supplementary film chamber or cassette may hold so-called one minute film or the newer ten second film, or other suitable form of what may broadly be called instant film, which includes developing means to provide a finished picture within a very short interval after the exposure is made.

The use of a back extension or supplementary film chamber of the kind just mentioned, normally renders the focusing or viewfinding chamber of the camera inoperative, because there is no corresponding lengthening of the path of light rays from the viewfinding lens to the focusing screen. The present invention overcomes this by providing a supplementary attachment or accessory for the viewfinding chamber, to lengthen the path of the focusing rays to an extent corresponding to the lengthening of the path of the picture taking rays, so that focusing can still be accomplished through the regular viewfinding or focusing lens system of the camera. Moreover, the supplementary viewfinding attachment of the present invention is so designed that it corrects for parallax.

Referring first to the form of the invention shown in FIG. 1, it has already been mentioned that the body 1 of the twin lens mirror reflex camera has the usual movable front member or lens board 2 which carries the picture taking lens 3 and the viewfinder or focusing lens 4, the front member 2 being adjustable forwardly and backwardly for focusing by means of the usual focusing knob 5. The film winding knobs 6 and 7 serve for positioning the film supply roll and the film take-up roll during normal picture taking operations when the supplementary chambers are not used, and these same knobs 6 and 7 may also be used for the film transport or advance of the film between successive exposures, although ordinarily this is accomplished by a film transport lever or crank well known in the art and mounted on the far side of the camera from that which is shown in FIG. 1.

When using the supplementary chambers for close-up work, however, the film knobs 6 and 7 are not employed, as the film is not in the normal location. For such close-up work, the usual detachable back is removed from the camera and is replaced by a special back 8 which has mounted thereon, either permanently or detachably, a special holder or chamber 9 of any suitable construction known per se, which constitutes a cassette or chamber for holding any desired sensitized material (roll film, or film pack, or glass plates, or sensitized paper, or "instant" picture material with developing agent, etc.) in a plane parallel to the normal film plane, but farther back at a greater distance from the picture taking lens 3. Thus for any given position of the lens board or camera front 2 relative to the body 1, the camera will be focused on an object at closer distance to the lens, than would be the case if the sensitized material were in the normal film plane rather than in the supplementary chamber or cassette.

As above mentioned, the chamber or cassette 9 is of a construction known in the art per se, the details of which are not important for purposes of the present invention. If it is detachable rather than mounted permanently on the special camera back 8, it may be attached to the camera back by means of rails 10.

As will understood by those familiar with "Rolleiflex" cameras and similar twin lens reflex cameras, the upper part of the camera body has a rectangular horizontal frame 11 in which the ground glass (or similar) focusing screen 12 is detachably received. A collapsible and erectable light hood or focusing hood 13 is normally arranged on this frame 11 and, when erected, shields the focusing screen 12 from stray lateral light so that the image can be clearly seen. The details of construction of the focusing hood are not important for purposes of the present invention. It is sufficient to say that any desired form of focusing hood may be used, so long as it is readily removable from and replaceable on the top of the camera, certain satisfactory forms of such hoods being disclosed in Heidecke Patent 2,912,912, granted November 17, 1959.

The removable hood of known form has bottom rails or flanges or lugs which engage in recesses in the top of the camera, in or near the frame 11, and which are normally held therein by known latching means 17. According to the present invention, the latching means is released, the light hood is removed from the camera, and the focusing screen 12 is completely removed, if it is of the removable type, or it is swung back to an out-of-the-way position, if it is of the hinged type (as shown, for example, in Patent 2,981,166). Then an intermediate member or focusing chamber extension member indicated in general at 14 is placed on the top of the camera, in the position formerly occupied by the focusing hood. The bottom of this extension 14 has a lower frame 15 which is substantially a duplicate of the bottom of the focusing hood 13, at least to the extent that it has flanges or lugs which will fit into the same slots on the top of the camera body into which the flanges of the focusing hood normally fit, and held therein by the same latching means 17. The top frame 16 at the upper edge of the extension member 14 is formed similarly to the top of the camera body, to the extent that it mates or fits against the bottom edge of the focusing hood 13, and the frame 16 is provided with latching means 18 similar to the latching means 17, to hold the focusing hood 13 detachably in place on the top frame 16 of the extension member 14. The top frame 16 also carries a focusing screen 12' of ground glass or the like.

The extension 14 is made of such dimensions that the new location of the focusing screen 12' is parallel to the original location of the focusing screen 12, but spaced or displaced from it by a distance equal to the spacing of the film plane in the cassette or supplementary film holder 9, relative to the original film plane in the camera body itself. Thus the focusing screen 12' in the supplementary viewfinding chamber 14 has the same relation to the viewfinding lens 4, that the film in the supplementary film chamber 9 has to the picture taking lens 3, and when the focusing knob 5 is operated to move the lens board 2 forwardly or rearwardly for focusing, a view which is correctly focused on the supplementary screen 12' will likewise be correctly focused on the film (or other sensitized material) in the supplementary film holder or cassette 9. The light hood or focusing hood 13, now affixed to the top of the supplementary chamber 14, serves to shield the image on the supplementary screen 12' from stray lateral light, just as it does when used on top of the camera around the normal focusing screen 12.

In addition to spacing the focusing screen 12' from the original position 12 in the direction of the viewfinding axis (bearing in mind that the viewfinding axis is bent because the rays are reflected by an oblique mirror in the viewfinding chamber) the present invention also offsets the screen 12' from the original screen location 12 in a direction parallel to these two screens, to an extent sufficient to compensate for parallax. This requires a rearward displacement of the screen 12' from a position directly above the screen 12, to such an extent that the axis extending through the centers of the two screens 12 and 12' is inclined to a perpendicular at the center of the screen 12, by an angle B. This angle B is expressed by the equation $$\tan B = \frac{a}{f}$$

in which $a$ is the spacing of the axes of the two lenses from each other, and $f$ is the focal length of the two lenses. This rearward offsetting of the screen 12' in order to allow for parallax is plainly seen in FIGS. 1 and 2.

By constructing a supplementary viewfinding chamber in this way, the camera can be used for close-up photographs while still retaining the ability to compose the picture and focus it by means of the reflex focusing chamber (with the supplementary focusing chamber attachment of the present invention), and without the need for using supplementary lenses or other supplementary optical elements in front of the regular lenses 3 and 4. A camera utilizing the accessories or attachments of the present invention is useful, for example, in photographing oscilloscope traces or in other close-up work, enabling the production of a photograph image of equal size to the object being photographed, or even of larger size than the object, if desired.

As above explained, the distance between the normal focusing screen 12 and the supplementary focusing screen 12' is the same as the distance from the normal film plane in the camera body, to the film plane in the supplementary film holder or cassette 9, whereas the extent to which the supplementary focusing screen 12' is offset rearwardly from a position directly above the regular focusing screen 12 is a function of the focus distance, that is, the distance from the camera lens to the object which is focused upon. By using the focusing knob 5 to move the front board or lens board 2 forwardly or rearwardly, the camera can be focused on objects through a range of distances, for any given position of the new film plane relative to the normal film plane and the new focusing screen 12' relative to the normal focusing screen 12, so that when constructing the attachment 14, in the rigid form illustrated in FIGS. 1 and 2, it is desirable to make the rearward offset (parallax correction) correct for a particular predetermined focus distance, such as the average distance of the focusing range, or a particular distance for which it is expected that the camera will be customarily used, when equipped with the supplementary film holder and the supplementary viewfinder chamber. For other focus distances within the range, the operator can estimate by eye the extent of parallax and make appropriate allowance.

Figure 3:
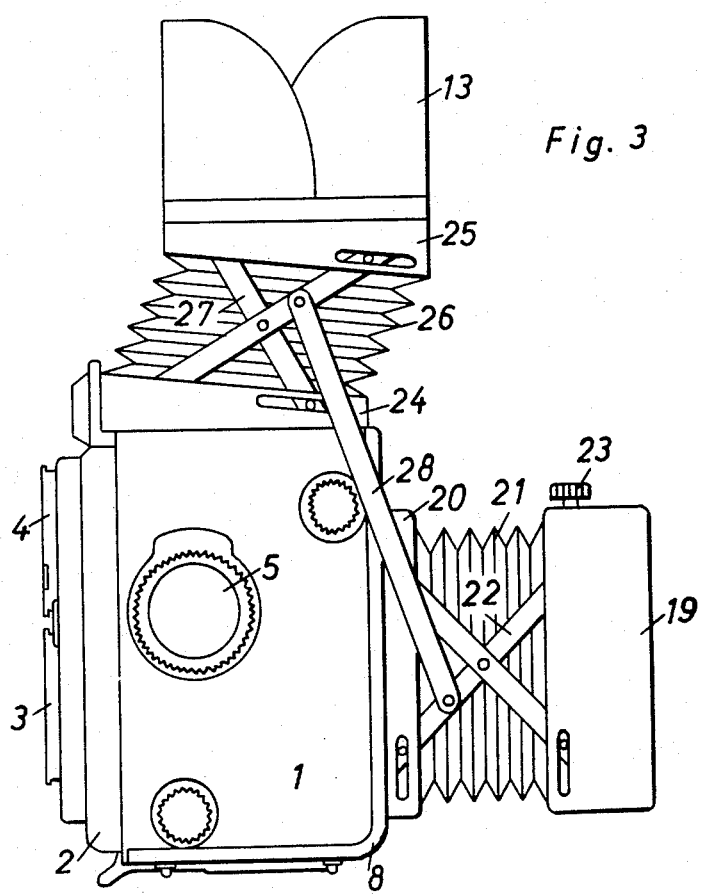
FIG. 3 is a schematic side elevation of a camera in accordance with a second embodiment of the invention.
Figure 4:
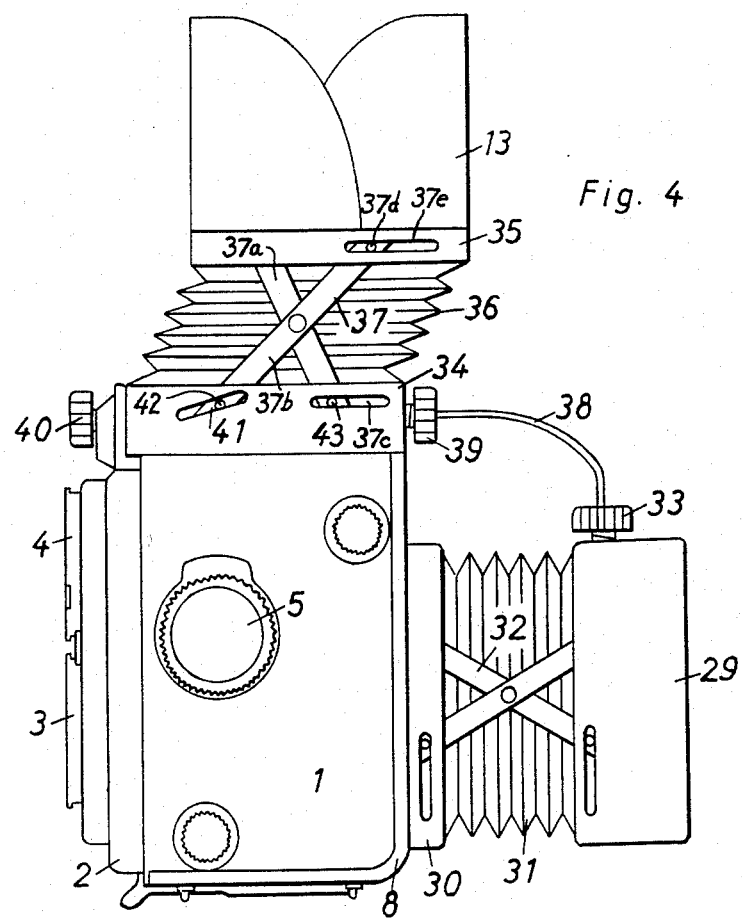
FIG. 4 is a similar view of a third embodiment.

According to further embodiments of the invention as illustrated in FIGS. 3–5, it is possible to make the supplementary viewfinder chamber of variable size in order to accommodate it to a varying distance of displacement of the film plane in the supplementary film holder or cassette. In the embodiments shown in FIGS. 3 and 4, the rigid film holder or cassette 9 of FIGS. 1 and 2, holding the film at an invariable distance from the normal film plane, is now replaced by a holder or housing 19 or 29, respectively. Like the earlier holder 9, the holder 19 or 29 can constitute either a roll film holder with conventional means for advancing the film from one frame to another, or a plate holder, or cut film holder, or holder for "instant picture" film or sensitized material combined with developing means, or can be simply an adapter for receiving and retaining a film holder secured to the back of the respective holder 19 or 29, all of these possible forms of holder being known per se, the details being unimportant for purposes of the present invention. In any event, the holder or housing 19 or 29 is connected to a base frame 20 or 30, respectively, by expansible and contractable lighttight means such as the bellows 21 or 31, respectively. The frame 20 or 30 fits in light-tight manner on the back 8 of the camera body, just as was the case with the previous film holder 9.

To keep the holder 19 or 29 in a definite adjusted position with respect to the frame 20 or 30 respectively, there is a lazy-tongs connection 22 or 32, respectively, the construction thereof being known per se. The lazy-tongs may be adjusted in known manner by the adjusting knob 23 or 33, respectively, serving to move the lazy-tongs so as to shift the holder 19 or 29 closer to or farther from the frame 20 or 30, but keeping the holder parallel to the frame at all times.

According to the invention, the supplementary viewfinder chamber is similarly constructed with expansible bellows and a lazy-tongs arrangement. Thus, in the form shown in FIG. 3, the supplementary chamber has a bottom frame 24 which fits on the top of the camera in place of the hood 13 which has been removed, and after removal or appropriate displacement of the original focusing screen 12. The supplementary chamber also has a top frame 25, the top of which holds the supplementary focusing screen 12′, and which is formed to receive and retain the bottom frame of the focusing hood 13, just as was the case in the earlier embodiment. The bottom frame 24 and top frame 25 are connected to each other by the expansible light-tight bellows 26, constructed in such manner that the upper end of the bellows is offset rearwardly from the lower end, as seen in FIG. 3. The frames 24 and 25 are connected to each other by lazy-tongs 27 of known form, serving to hold the frame 25 in a given position of adjustment relative to the frame 24, and to maintain the supplementary focusing screen 12′ parallel to the position of the normal focusing screen 12 which has been removed from its normal position. There is a coupling link 28 between the lazy-tongs 22 of the film holder and the lazy-tongs 27 of the supplementary viewfinding chamber, so that adjustment of the position of the holder 19, by the adjusting knob 23, serves simultaneously to shift the lazy-tongs 27 of the supplementary viewfinding chamber to shift the position of the focusing screen 12′ to the same extent.

The bellows 26 and lazy-tongs 27 are so constructed that the upper frame 25 of the supplementary chamber moves upwardly and downwardly, not along a line perpendicular to the normal location of the regular focusing screen 12, but on a line at the above-mentioned angle B to such a perpendicular. Thus the parallax correction is maintained during the adjusting movements.

The embodiment shown in FIG. 4 is similar in a general way to that of FIG. 3, but provides for an additional adjustment. As in the previous case, the supplementary viewfinding chamber has a lower frame 34 which fits on the top of the camera (in place of the focusing hood, and after removal of the normal focusing screen) and an upper frame 35 which carries the focusing screen 12′ and which receives and retains the focusing hood 13 which was removed from the top of the camera. As before, bellows 36 connect the frames 34 and 35 with each other, and there is a lazy-tongs 37 connecting the two frames.

In the previous embodiment of FIG. 3, both of the arms of the lazy-tongs (the construction being duplicated on opposite sides of the supplementary chamber) have one fixed pivot and one pivot sliding in a slot, as shown. In the modification of FIG. 4, one arm 37a of the lazy-tongs has a fixed pivot to the top frame 35, but at the other end of the arm 37a the pivot 43 slides in a slot 37c in the frame 34, as shown. The other arm 37b of the lazy-tongs 37 has pivots in slots at both ends. At its upper end, the pivot 37d of this second arm is loose to slide in a slot 37e in the upper frame 35. At its lower end, the pivot 42 is received in an inclined slot 41 in the frame 34, but it is restrained against movement along this slot 41, under normal operating conditions, and moves only during certain adjustments.

The control mechanism is shown somewhat schematically in FIG. 5. As already mentioned, the lazy-tongs 32 of the supplementary film holder 29 is controlled by an adjusting knob 33. This adjusting knob is preferably connected by any suitable form of connection, such as the flexible shaft 38, to an adjusting knob 39 on the rear of the lower frame 34 of the supplementary viewfinding chamber. The lower pivot 43 of the arm 37a of the lazy-tongs is pivoted to a slide member 44 which slides non-rotatably along a guideway such as a pin 45 fixed to the frame 34, and controlled in its movements along this guideway by means of a screw thread 46 operatively connected to the adjusting knob 39 which, as above mentioned is connected by the device 38 to the adjusting knob 33 of the film holder.

Thus any adjustment of the film holder 29 toward or away from the back of the camera, by operation of the knob 33, will cause corresponding operation of the knob 39, turning the screw 46 and moving the slide 44 to cause corresponding movement of the pivot 43 of the lazy-tongs, thereby moving the upper frame 35 farther from or closer to the lower frame 34, as the case may be, to correspond with the motion of the holder 29 farther from or closer to the camera body. Meanwhile, the other arm 37b of the lazy-tongs cooperates in the normal way, since the lower pivot 42 thereof is held stationary at this time, and the upper pivot 37d can slide freely along its slot 37e in the upper frame 35.

For the other adjustment, the lower pivot 42 of the second arm 37b of the lazy-tongs is not only engaged in the above mentioned inclined slot 41, but also is engaged in a fork or vertical slot 47 in the slide 48 which slides non-rotatably along any suitable fixed guideway on the frame 34, such as the guide pin 49. Its movements are controlled by the screw thread 50 attached to the knob 40. Until the knob 40 is turned, the lower pivot 42 of the second arm 37b of the lazy-tongs is held stationary and cannot slide along its slot 41, although the pivot at the upper end of the same arm can slide freely along its slot in the upper frame 35, as required by adjusting movements of the arm 37a. Thus the lazy-tongs operates in the normal way. But by turning the knob 40 to turn the screw 50, the slide 48 is moved longitudinally, to move the pivot 42 longitudinally along the slot 41. Because of the fact that the slot 41 in the lower frame 34 is inclined at an angle, operation of the knob and screw 40, 50 to move the pivot 42 along the slot 41, will not only raise or lower the frame 35 but also will tilt the entire lazy-tongs system bodily to a limited extent, thus altering the above mentioned angle B as required.

Of course this same construction is duplicated on opposite sides of the supplementary chamber 34, 35, 36, and preferably each of the knobs 39 and 40 is operatively connected to the pair of slides 44 or 48, respectively, at opposite sides of the frame 34.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A twin lens reflex camera of the type having a picture taking chamber and a viewfinder chamber with a focusing screen normally positioned to form one wall of the viewfinder chamber and having a picture taking lens and a viewfinder lens with their axes separated from each other and mounted for limited conjoint axial movement, and having a rearward attachment on the picture taking chamber for holding image-receiving sensitized material in a position spaced rearwardly from the normal position of such material so as to place it at an increased distance from the picture taking lens, characterized by a supplementary viewfinder chamber attachment mounted on the viewfinder chamber and including means for holding a supplementary focusing screen at a position spaced from the normal focusing screen position in a perpendicular direction to an extent corresponding to the displacement of the sensitized material from its normal position and offset in a parallel direction to an extent to compensate substantially for the parallax effect caused by the separation of the axis of the finder lens from the axis of the picture taking lens, further characterized by the fact that said supplementary viewfinder chamber attachment is adjustable to vary the distance of separation of the supplementary focusing screen from the normal position of the focusing screen, and by the fact that the supplementary focusing screen is adjustable in a direction along an axis inclined at an angle B to a perpendicular to the normal focusing screen, the angle B being the angle whose tangent is the distance of separation of the axes of the two lenses from each other divided by the focal length of the lenses.

2. A construction as defined in claim 1, further including means for varying the angle B to accommodate varying focus distances of the object focused upon.

3. A twin lens reflex camera of the type having a picture taking chamber and a viewfinder chamber with a focusing screen normally positioned to form one wall of the viewfinder chamber and having a picture taking lens and a viewfinder lens with their axes separated from each other and mounted for limited conjoint axial movement, and having a rearward attachment on the picture taking chamber for holding image-receiving sensitized material in a position spaced rearwardly from the normal position of such material so as to place it at an increased distance from the picture taking lens, characterized by a supplementary viewfinder chamber attachment mounted on the viewfinder chamber and including means for holding a supplementary focusing screen at a position spaced from the normal focusing screen position in a perpendicular direction to an extent corresponding to the displacement of the sensitized material from its normal position and offset in a parallel direction to an extent to compensate substantially for the parallax effect caused by the separation of the axis of the finder lens from the axis of the picture taking lens, further characterized by the fact that said supplementary viewfinder chamber attachment is adjustable to vary the distance of separation of the supplementary focusing screen from the normal position of the focusing screen, and further characterized by the inclusion of first adjusting means for adjusting the rearward spacing of the sensitized material, second adjusting means for adjusting said spacing of the supplementary focusing screen, and coupling means for coupling the first adjusting means and the second adjusting means to each other for conjoint movement.

4. A construction as defined in claim 3, in which said first adjusting means includes lazy-tongs links, said second adjusting means also includes lazy-tongs links, and said coupling means includes a link bar operatively connecting a link of the first adjusting means to a link of the second adjusting means.

5. A construction as defined in claim 3, in which said first adjusting means includes a rotary knob, said second adjusting means also includes a rotary knob, and said coupling means includes a flexible shaft coupling the two rotary knobs to each other for conjoint rotation.

6. A close-up focusing attachment for use with a twin lens reflex camera of the type having a viewfinder chamber, a normal focusing screen shiftable out of its normal operating position with respect to said chamber, and a light hood detachably mounted on said chamber, said attachment comprising a bottom rectangular frame shaped and adapted to be detachably mounted on said chamber in place of the light hood when the light hood has been removed from said chamber, a top rectangular frame holding a supplementary focusing screen in a position approximately parallel to and spaced from the bottom frame, and substantially light tight side walls connecting the bottom frame to the top frame, said top frame being offset from a position centered directly over the bottom frame in a direction to correct at least partially for parallax in the normal intended use of the attachment on a twin lens reflex camera, said side walls including expansible bellows, so that said top frame may be adjusted to positions closer to or farther away from said bottom frame.

7. A construction as defined in claim 6, further including control means for expanding and contracting said bellows to move the top frame toward and away from the bottom frame, and other control means for changing the offset relation of said top and bottom frames with respect to each other.

References Cited by the Examiner
UNITED STATES PATENTS

| | | | |
|---|---|---|---|
| 1,037,035 | 8/12 | Millard | 95—11 |
| 1,666,499 | 4/28 | Lucas | 95—49 |
| 1,724,566 | 8/29 | Davidson | 95—11 |
| 2,679,197 | 5/54 | Francisco | 95—44 |
| 2,741,964 | 4/56 | Lachmann | 95—44 |

NORTON ANSHER, *Primary Examiner.*

JOHN M. HORAN, *Examiner.*